July 17, 1928.
F. E. SODE
HYDROMETER
Filed Nov. 1, 1926
1,677,801
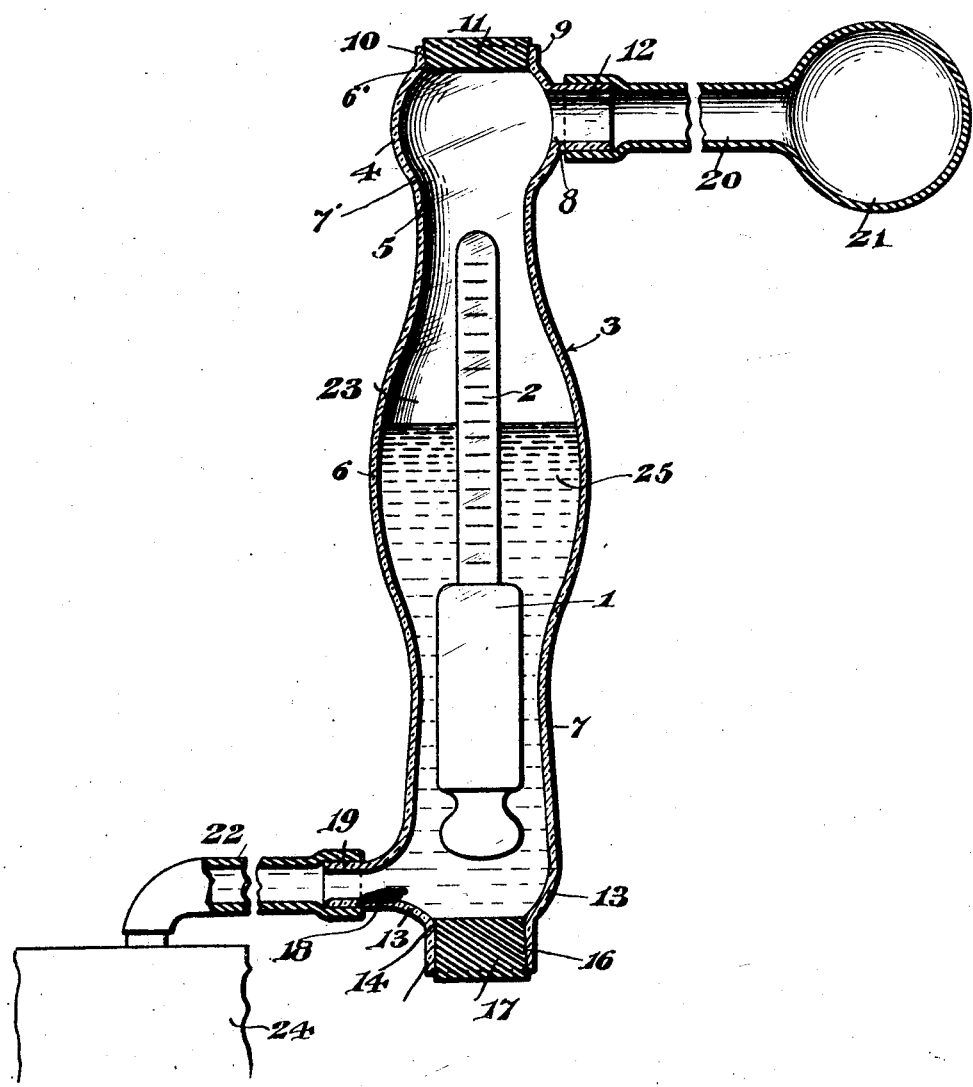
INVENTOR.
Frank E. Sode,
BY
Geo. P. Kimmel, ATTORNEY.

Patented July 17, 1928.

1,677,801

UNITED STATES PATENT OFFICE.

FRANK E. SODE, OF CHICAGO, ILLINOIS.

HYDROMETER.

Application filed November 1, 1926. Serial No. 145,498.

This invention relates to a hydrometer primarily designed for measuring the amount of charge of electricity in a battery, but it is to be understood that a hydrometer, in accordance with this invention can be employed for any purposes for which it is applicable, and the invention has for its object to provide, as hereinafter set forth, a device of the class referred to, constructed in a manner to prevent, when tilted in one direction, dropping acid or other liquid when the device is pulled away from the battery after being used.

Further objects of the invention are to provide, in a manner as hereinafter set forth, a hydrometer including a transparent tube or jar carrying the meter element and having means for establishing communication therebetween and a battery and with the tube or jar further provided with a suction means for drawing therein the liquid from the battery whereby the meter element coacting with the liquid will indicate the amount of the charge of electricity in the battery.

A further object of the invention is to provide, in a manner as hereinafter set forth, a hydrometer including a transparent tube or jar for the meter element, and with the tube or jar constructed of glass and provided with means at each end to permit of positioning therein and removing therefrom the meter element, and further with said means acting to prevent breakage of the ends of the tube or jar by the impact of the meter element.

Further objects of the invention are to provide, in a manner as hereinafter set forth, a hydrometer for the purpose referred to and which is simple in its construction and arrangement, strong, durable, compact, thoroughly efficient in its use, conveniently handled, and comparatively inexpensive to manufacture.

With the foregoing and other objects in view, the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claims hereunto appended.

The drawing illustrates in vertical section, a hydrometer in accordance with this invention and further the adaptation thereof in connection with an electric storage battery.

Referring to the drawing 1 indicates the meter element, of known construction, and which is provided with suitable graduations as indicated at 2, and 3 generally indicates a transparent tube or jar in which is arranged the meter element 1.

The tube 3 is constructed of glass, which is transparent and which is formed with a head portion 4, a neck portion 5, a body portion 6, and a base portion 7. The head portion 4 is of spherical contour and provided with an opening 6' at its outer end and an opening 7' at its inner end. One side of the head 4 is also provided with an opening 8. Formed integral with the head 4 and surrounding the opening 6 is an annular flange 9, having a flaring inner face 10, and tightly engaging with the inner face of the flange 9 is a resilient closure plug 11 which also acts as a cushion. Formed integral with the head 4 and having its inner face registering with the wall of the opening 8, is a right angularly disposed tubular extension 12. The neck 5 is of flaring contour and has its upper end merging into the inner end of the head 4 and the inner face of the neck 5 is flush with the wall of the opening 7' formed at the inner end of the head 4.

The body portion 6, is what may be termed of bulged contour, and gradually increases in diameter from each end towards the transverse center thereof. The body portion 6 merges into the inner end of the neck 5 and in the inner end of the base portion 7. The major part of the body portion 6 is of greater diameter than the neck 5 and base portion 7 thereby increasing the capacity of the tube 3, than would be the case, if the tube was of the same diameter throughout. The intermediate part of the body portion 6 is of greater diameter than the head portion 4. The body portion 6 tapers from its transverse center towards each end thereof and is of curved contour in the direction of its length in longitudinal section.

The base portion 7 from its point of joinder with the body portion 6, gradually increases in diameter for the major portion of its length, and the outer terminal portion part of the base portion 7 is inturned as at 13. The base portion 7 is provided with an opening 14 at its outer end and formed integral with the base portion 7, is an annular flange 15 having its inner face flush with the wall of the opening 14. The inner face of the flange 15 is tapered, as at 16 and tightly engaging with said inner face 16, is a resilient closure plug 17, which also acts as a cushion when impacted upon by the meter element 1. One side of the base portion 7, at its outer end, is formed with a tapered opening 18, and also with a right angularly disposed tubular extension 19 having its inner face forming a continuation of the wall of the opening 18.

The resilient plugs 11 and 17 provide a liquid tight joint at the ends of the tube 3 and further act to prevent the breakage of the ends of the tube 3, when impacted upon by the meter element 1. The meter element 1 preferably is inserted into the tube 3, by removing the plug 11, after which the latter is mounted in the flange 9.

Connected with the tubular extension 12, is a flexible tubing 20 provided with a hollow spherical outer end 21, which constitutes a suction ball and the diameter of the latter is materially greater than the diameter of the tubing 20. Attached to the tubular extension 19 is a flexible tubing 22 for establishing communication between the liquid receiving chamber 23, formed by the tubing 3, and the battery 24.

When the ball 21 is compressed and expanded, the liquid 25, from the battery 24, will be drawn into the chamber 23 and which raises the meter element 1, and when the latter sinks to the desired point in the liquid 25, the level of the latter, associating with a graduation 2, will measure the amount of charge of electricity in a battery.

The angularly disposed tubular extension 12, 19 permit of a test being made without moving a battery from its cabinet or other container by simply removing the cap and inserting an extension in the battery. The tubular extension 12 makes it possible to complete the operation of reading without danger of having the meter element forced in the suction ball as often happens when the suction ball is above such element. A further advantage obtained by the angularly disposed tubular extensions is that the volume of air is equal to two-thirds the volume of the tube or jar making it impossible for any liquid to enter the suction ball. This consequently assures an accurate reading.

The shape of the portions 6 and 7 eliminates the danger of the meter element sticking to the sides of the tube or jar as such element cannot come in contact therewith.

It is thought that the many advantages of a hydrometer, in accordance with this invention, can be readily understood, and although the preferred embodiment of the invention is as illustrated and described, yet it is to be understood that changes in the details of construction can be had which will fall within the scope of the invention as claimed.

What I claim is:

1. A hydrometer for the purpose set forth comprising a transparent tube having each end thereof closed by an imperforate resilient plug, a meter element arranged within the tube, said tube provided in proximity to one end with means disposed at right angles thereto for connecting a suction feeding device therewith and in proximity to its other end with means disposed at right angles thereto for establishing communication between the interior of the tube and a liquid supply.

2. A hydrometer comprising a transparent tube provided with a bulged portion intermediate the ends thereof, imperforate plugs for closing the ends of the tube, a meter element arranged in the tube, and said tube provided with a pair of oppositely extending, spaced tubular extensions disposed at right angles thereto, one for connection with a suction creating means and the other for establishing communication between the tube and a liquid supply.

3. A hydrometer comprising a transparent tube, imperforate plugs for closing the ends thereof, a meter element arranged in the tube, and said tube provided with a pair of oppositely extending, spaced tubular extensions disposed at right angles thereto, one for connecting to the tube a suction creating means and the other for establishing communication between the tube and a liquid supply.

4. A hydrometer comprising a transparent tube having reduced open ends, an imperforate resilient plug mounted in each reduced end of the tube for closing the same, said tube provided in proximity to each reduced end thereof with a lateral tubular extension, one of said tubular extensions providing means for connecting with the tube a suction creating means and the other of said extensions providing for establishing communication between the tube and a liquid supply, and a meter element operating in said tube.

5. A hydrometer comprising a transparent tubular structure including a spherical head portion open at its top and having a flange surrounding said opening, said head further provided with an opening at one side and a tubular extension registering with said side opening, said extension disposed at right angles with respect to the head, said tubular structure further including a bulged body portion terminating in a neck merging into said head, and a base portion merging into said body portion and having its lower end formed with an opening and an integral flange surrounding the opening and further provided with an opening in the side thereof and a tubular extension registering with such side opening, an imperforate resilient plug mounted in the flange integral with the head, an imperforate resilient plug mounted in the flange integral with the base, a meter element arranged within said structure, one of said tubular extensions providing means for connecting a suction feeding device with said structure and the other tubular extension providing means for establishing communication between the interior of the tube and a liquid supply.

6. A hydrometer for the purpose set forth comprising a transparent tube provided at each end with a pair of openings disposed at right angles with respect to each other, an imperforate resilient plug mounted in one of the openings at one end and a tubular extension integral with the tube and opening into the other of the openings at such end, an imperforate resilient plug mounted in one of the openings at the other end of the tube and a tubular extension integral with the tube and communicating with the other opening of such end, said plugs opposing each other, a meter element arranged within said tube, one of said extensions providing means for connecting a suction device with the tube and the other said extension providing means for establishing communication between the interior of the tube and a liquid supply.

7. A hydrometer for the purpose set forth comprising a transparent tube provided at each end with a pair of openings disposed at right angles with respect to each other, an imperforate resilient plug mounted in one of the openings at one end and a tubular extension integral with the tube and opening into the other of the openings at such end, an imperforate resilient plug mounted in one of the openings at the other end of the tube and a tubular extension integral with the tube and communicating with the other opening of such end, said plugs opposing each other, a meter element arranged within said tube, one of said extensions providing means for connecting a suction device with the tube and the other said extension providing means for establishing communication between the interior of the tube and a liquid supply, said extensions arranged on opposite sides of the tube and in proximity to said plugs.

8. A hydrometer for the purpose set forth comprising a transparent tube open at each end, each end of said tube being in the form of an annular flange, an imperforate resilient plug mounted in each flange for closing the ends of the tube, said body provided on opposite sides thereof and in proximity to said flanges with openings, oppositely disposed, tubular members integral with said body, extending at right angles to the latter and registering with said openings and one providing means for connecting a suction device with the tube and the other providing means for establishing communication between the interior of the tube and a liquid supply, and a meter element arranged within said tube.

9. A hydrometer for the purpose set forth comprising a transparent tube open at each end, each end of said tube being in the form of an annular flange, an imperforate resilient plug mounted in each flange for closing the ends of the tube, said body provided on opposite sides thereof and in proximity to said flanges with openings, oppositely disposed, tubular members integral with said body, extending at right angles to the latter and registering with said openings and one providing means for connecting a suction device with the tube and the other providing means for establishing communication between the interior of the tube and a liquid supply, and a meter element arranged within said tube, said tube provided intermediate its ends with a bulged portion.

10. A hydrometer for the purpose set forth comprising a transparent tube open at each end, each end of said tube being in the form of an annular flange, an imperforate resilient plug mounted in each flange for closing the ends of the tube, said body provided on opposite sides thereof and in proximity to said flanges with openings, oppositely disposed, tubular members integral with said body, extending at right angles to the latter and registering with said openings and one providing means for connecting a suction device with the tube and the other providing means for establishing communication between the interior of the tube and a liquid supply, a meter element arranged within said tube, said tube provided intermediate its ends with a bulged portion, and the inner faces of each of said flanges being flared to provide the wedging engagement with the plug.

In testimony whereof, I affix my signature hereto.

FRANK E. SODE.